(12) United States Patent
Newby

(10) Patent No.: US 12,299,235 B2
(45) Date of Patent: May 13, 2025

(54) INTEROPERABILITY OF RF ANTENNA AND CAPACITIVE TOUCH KEYPAD

(71) Applicant: Schlage Lock Company LLC, Carmel, IN (US)

(72) Inventor: David I. Newby, Plainfield, IN (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

(21) Appl. No.: 17/566,969

(22) Filed: Dec. 31, 2021

(65) Prior Publication Data

US 2023/0214056 A1 Jul. 6, 2023

(51) Int. Cl.
*G06F 3/041* (2006.01)
*G06F 3/044* (2006.01)
*G07C 9/00* (2020.01)

(52) U.S. Cl.
CPC ............ *G06F 3/0418* (2013.01); *G06F 3/044* (2013.01); *G07C 9/00309* (2013.01); *G07C 2009/00634* (2013.01)

(58) Field of Classification Search
CPC ... G06F 3/0418; G06F 3/044; G07C 9/00309; G07C 2009/00634
See application file for complete search history.

(56) References Cited

U.S. PATENT DOCUMENTS

| | | | | |
|---|---|---|---|---|
| 2012/0306803 | A1* | 12/2012 | Kuo | G06F 3/041 345/174 |
| 2014/0292481 | A1* | 10/2014 | Dumas | G07C 9/00174 340/5.61 |
| 2017/0178432 | A1* | 6/2017 | Newby | G07C 9/28 |
| 2019/0035183 | A1* | 1/2019 | Bennett | G06K 7/10316 |

OTHER PUBLICATIONS

English Translation of CN 112435373 (Year: 2020).*
AN10834; NXP; Aug. 10, 2021; Rev. 4.2; 19 pages.
International Search Report; International Searching Authority; International Application No. PCT/US2023/010048; Apr. 26, 2023; 2 pages.
Written Opinion of the International Searching Authority; International Searching Authority; International Application No. PCT/US2023/010048; Apr. 26, 2023; 9 pages.

* cited by examiner

*Primary Examiner* — Patrick N Edouard
*Assistant Examiner* — Eboni N Giles
(74) *Attorney, Agent, or Firm* — Taft Stettinius & Hollister LLP

(57) ABSTRACT

A method according to one embodiment includes placing a microcontroller of an access control device in a sleep state, monitoring a radio frequency (RF) field using a near field communication (NFC) controller and an NFC antenna of the access control device, waking the microcontroller from the sleep state in response to detecting that an RF field value of the RF field has surpassed a predefined threshold, masking capacitive touch events received by the microcontroller from a capacitive touch controller in response to waking the microcontroller from the sleep state, processing RF-intensive communication between the access control device and a mobile device in response to masking the capacitive touch events, and unmasking capacitive touch events received by the microcontroller from the capacitive touch controller in response to processing the RF-intensive communication.

17 Claims, 4 Drawing Sheets

INTEROPERABILITY OF RF ANTENNA AND CAPACITIVE TOUCH KEYPAD

BACKGROUND

In certain circumstances, it may be desirable for an electronic access control device (e.g., a lock or a reader) to include both a capacitive touch keypad and an NFC antenna (e.g., for a smart card reader on the electronic access control device). However, this can be a challenge, because capacitive touch signals are susceptible to noise interference, and an NFC antenna radiating in close proximity to the capacitive touch keypad matrix can induce false key presses and/or other interference-related issues.

Some existing approaches to avoiding the coupling of the antenna with the capacitive keypad matrix involve separating the two components by a distance. For example, the capacitive matrix and the antenna may be provided on separate printed circuit board assemblies (PCBAs). However, separating the two components often requires that the overall product have a greater size, particularly when separate PCBAs are utilized. The use of separate PCBAs also introduces cost and complexity. Accordingly, there remains a need for further improvements in this technological field.

SUMMARY

One embodiment is directed to a unique system, components, and methods for the interoperability of an RF antenna and a capacitive touch keypad. Other embodiments are directed to apparatuses, systems, devices, hardware, methods, and combinations thereof for the interoperability of an RF antenna and a capacitive touch keypad.

According to an embodiment, a method may include placing a microcontroller of an access control device in a sleep state, monitoring a radio frequency (RF) field using a near field communication (NFC) controller electrically coupled to an NFC antenna of the access control device, waking the microcontroller from the sleep state in response to detecting that an RF field value of the RF field has surpassed a predefined threshold, masking capacitive touch events received by the microcontroller from a capacitive touch controller in response to waking the microcontroller from the sleep state, processing RF-intensive communication between the access control device and a mobile device in response to masking the capacitive touch events, and unmasking capacitive touch events received by the microcontroller from the capacitive touch controller in response to processing the RF-intensive communication.

In some embodiments, the method may further include calibrating the NFC controller to a current state of the RF field detected by the NFC antenna of the access control device.

In some embodiments, placing the microcontroller in the sleep state may include placing the microcontroller in the sleep state in response to calibrating the NFC controller to the current state of the RF field.

In some embodiments, the method may further include re-calibrating the NFC controller to a new state of the RF field detected by the NFC antenna of the access control device in response to unmasking the capacitive touch events received by the microcontroller from the capacitive touch controller.

In some embodiments, the method may further include delaying for a predefined delay period after processing the RF-intensive communication between the access control device and the mobile device, and unmasking the capacitive touch events may include unmasking the capacitive touch events after delaying for the predefined delay period.

In some embodiments, masking the capacitive touch events may include ignoring any capacitive touch events received by the microcontroller from the capacitive touch controller.

In some embodiments, processing the RF-intensive communication between the access control device and the mobile device may include processing access credential data.

In some embodiments, the access control device may be embodied as or include an electronic lock having a lock mechanism configured to control access to a passageway.

According to another embodiment, an access control device may include a radio frequency (RF) antenna, a capacitive touch controller, a wireless communication controller electrically coupled to the RF antenna and configured to process signals received using the RF antenna, and a microcontroller configured to operate in a wake state and a sleep state that consumes less power than the wake state. The wireless communication controller may be further configured to monitor an RF field via the RF antenna and prompt the microcontroller to wake from the sleep state in response to detecting that an RF field value of the RF field has surpassed a predefined threshold. The microcontroller may be further configured to transition from the sleep state to the wake state, mask capacitive touch events received from the capacitive touch controller after the transition to the wake state, process RF-intensive communication between the access control device and a mobile device while the capacitive touch events are masked, and unmask capacitive touch events received from the capacitive touch controller after the RF-intensive communication has been processed.

In some embodiments, the microcontroller may consume a negligible amount of power while in the sleep state.

In some embodiments, the RF antenna may be embodied as or include a near field communication (NFC) antenna and the wireless communication controller may be embodied as or include an NFC controller.

In some embodiments, the NFC controller may be further configured to calibrate to a current state of the RF field detected by the NFC antenna.

In some embodiments, the microcontroller may be further configured to transition from the wake state to the sleep state in response to calibration of the NFC controller.

In some embodiments, the NFC controller may be further configured to re-calibrate to a new state of the RF field detected by the NFC antenna in response to the capacitive touch events being unmasked.

In some embodiments, the capacitive touch events may be unmasked after a predefined delay period subsequent to the RF-intensive communication being processed.

In some embodiments, to mask the capacitive touch events may include to ignore any capacitive touch events received from the capacitive touch controller.

In some embodiments, the RF-intensive communication may include an exchange of access credential data.

In some embodiments, the access control device may further include a lock mechanism configured to control access to a passageway.

According to yet another embodiment, an access control device may include a near field communication (NFC) antenna, a capacitive touch controller, an NFC controller electrically coupled to the NFC antenna and configured to process signals received using the NFC antenna, and a microcontroller configured to operate in a wake state and a sleep state that consumes less power than the wake state. The NFC controller may be further configured to monitor an RF field via the NFC antenna and prompt the microcontroller to wake from the sleep state in response to detecting that an RF field value of the RF field has surpassed a predefined threshold. The microcontroller may be further configured to transition from the sleep state to the wake state, process RF-intensive communication between the access control device and a mobile device while capacitive touch events received by the capacitive touch controller are prevented from being processed by the microcontroller, and process capacitive touch events received from the capacitive touch controller after the RF-intensive communication has been processed.

In some embodiments, the mobile device may be embodied as a smartphone or a smartcard.

This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Figure 1:
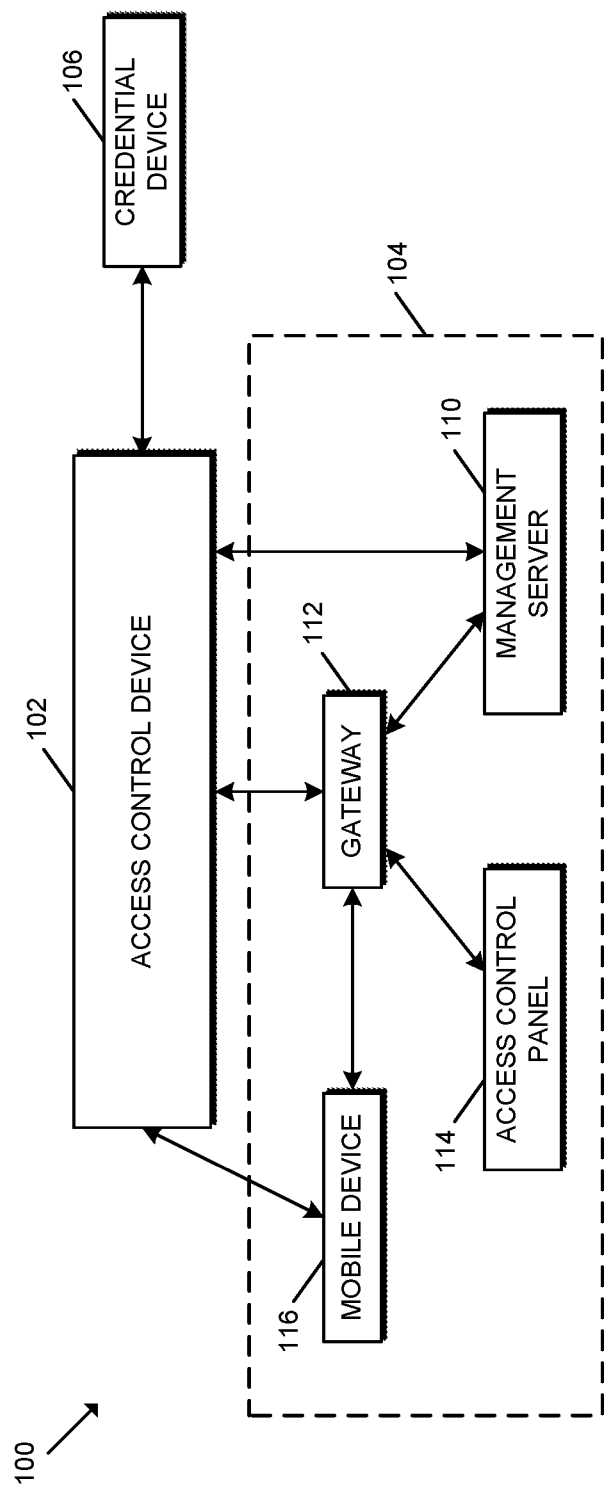
FIG. 1 is a simplified block diagram of at least one embodiment of an access control system.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, an access control system 100 includes an access control device 102, a management system 104, and a credential device 106. Further, the management system 104 may include a management server 110, a gateway device 112, an access control panel 114, and/or a mobile device 116.

It should be appreciated that the access control device 102, the management system 104, the credential device 106, the management server 110, the gateway device 112, the access control panel 114, and/or the mobile device 116 may be embodied as any type of device or collection of devices suitable for performing the functions described herein. More specifically, in the illustrative embodiment, the access control device 102 may be embodied as any type of device capable of controlling access through a passageway. For example, in various embodiments, the access control device 102 may be embodied as an electronic lock (e.g., a mortise lock, a cylindrical lock, or a tubular lock) or a peripheral controller of a passageway. Depending on the particular embodiment, the access control device 102 may include a credential reader or be electrically/communicatively coupled to a credential reader configured to communicative with credential devices 106. As described in reference to the access control device 200 of FIG. 2, the illustrative access control device 102 may include a microcontroller, NFC/RF controller, NFC/RF antenna, capacitive touch controller, and/or lock mechanism configured to perform the functions described herein.

In the illustrative embodiment, one or more of the credential devices 106 may be embodied as a passive credential device having a credential identifier (e.g., a unique ID) stored therein and is "passive" in the sense that the credential device is configured to be powered by radio frequency (RF) signals received from a credential reader. In other words, such passive credentials do not have an independent power source but, instead, rely on power that is induced from RF signals transmitted from other devices in the vicinity of the credential. In particular, in some embodiments, one or more of the passive credentials may be embodied as a proximity card, which is configured to communicate over a low frequency carrier of nominally 125 kHz, and/or a smartcard, which is configured to communicate over a high frequency carrier frequency of nominally 13.56 MHz. However, it should be appreciated that, in other embodiments, each of the credential devices 106 may be embodied as any type of passive or active credential device capable of performing the functions described herein. In some embodiments, the credential device 106 may be embodied as an "active" credential device such as a smartphone, powered dongle, and/or other mobile device.

As described herein, the management system 104 may be configured to manage credentials of the access control system 100. For example, the management system 104 may be responsible for ensuring that the access control devices 102 have updated authorized credentials, whitelists, blacklists, device parameters, and/or other suitable data. Additionally, in some embodiments, the management system 104 may receive security data, audit data, raw sensor data, and/or other suitable data from the access control devices 102 for management of the access control system 100. In some embodiments, one or more of the devices of the management system 104 may be embodied as an online server or a cloud-based server. Further, in some embodiments, the management system 104 may communicate with multiple access control devices 102 at a single site (e.g., a particular building) and/or across multiple sites. That is, in such embodiments, the management system 104 may be configured to receive data from access control devices 102 distributed across a single building, multiple buildings on a single campus, or across multiple locations.

It should be appreciated that the management system 104 may include one or more devices depending on the particular embodiment of the access control system 100. For example, as shown in FIG. 1, the management system 104 may include a management server 110, a gateway device 112, an access control panel 114, and/or a mobile device 116 depending on the particular embodiment. The functions of the management system 104 described herein may be performed by one or more of those devices in various embodiments. For example, in some embodiments, the management server 110 may perform all of the functions of the management system 104 described herein. Further, in some embodiments, the gateway device 112 may be communicatively coupled to the access control device 102 such that the other devices of the management system 104 (e.g., the management server 110, the access control panel 114, and/or the mobile device 116) may communicate with the access control device 102 via the gateway device 112.

In some embodiments, the access control device 102 may communicate with the management server 110 over a Wi-Fi connection and/or with the mobile device 116 over a Bluetooth connection. Additionally, the access control device 102 may communicate with the management server 110 and/or the access control panel 114 via the gateway device 112. As such, in the illustrative embodiment, the access control device 102 may communicate with the gateway device 112 over a Wi-Fi connection and/or a Bluetooth connection, and the gateway device 112 may, in turn, forward the communicated data to the relevant management server 110 and/or access control panel 114. In particular, in some embodiments, the gateway device 112 may communicate with the access control panel 114 over a serial communication link (e.g., using RS-485 standard communication), and the gateway device 112 may communicate with the management server 110 over a Wi-Fi connection, an Ethernet connection, or another wired/wireless communication connection. As such, it should be appreciated that the access control device 102 may communicate with the management server 110 via an online mode with a persistent real-time communication connection or via an offline mode (e.g., periodically or in response to an appropriate condition) depending on the particular embodiment (e.g., depending on whether the access control device 102 is offline). As indicated above, in other embodiments, it should be appreciated that the access control device 102 may communicate with the devices of the management system 104 via one or more other suitable communication protocols.

It should be appreciated that, in some embodiments, each of the access control device 102, the management system 104, the credential device 106, the management server 110, the gateway device 112, the access control panel 114, and/or the mobile device 116 may be embodied as one or more computing devices similar to the computing system 300 described below in reference to FIG. 3. For example, in various embodiments, each of the access control device 102, the management system 104, the credential device 106, the credential the management server 110, the gateway device 112, the access control panel 114, and/or the mobile device 116 may include a processing device 302 and a memory 306 having stored thereon operating logic 308 for execution by the processing device 302 for operation of the corresponding device.

It should be further appreciated that, although the management system 104 and the management server 110 are described herein as one or more computing devices outside of a cloud computing environment, in other embodiments, the system 104 and/or server 110 may be embodied as a cloud-based device or collection of devices. Further, in cloud-based embodiments, the system 104 and/or server 110 may be embodied as a "serverless" or server-ambiguous computing solution, for example, that executes a plurality of instructions on-demand, contains logic to execute instructions only when prompted by a particular activity/trigger, and does not consume computing resources when not in use. That is, the system 104 and/or server 110 may be embodied as a virtual computing environment residing "on" a computing system (e.g., a distributed network of devices) in which various virtual functions (e.g., Lambda functions, Azure functions, Google cloud functions, and/or other suitable virtual functions) may be executed corresponding with the functions of the system 104 and/or server 110 described herein. For example, when an event occurs (e.g., data is transferred to the system 104 and/or server 110 for handling), the virtual computing environment may be communicated with (e.g., via a request to an API of the virtual computing environment), whereby the API may route the request to the correct virtual function (e.g., a particular server-ambiguous computing resource) based on a set of rules. As such, when a request for data is made (e.g., via an appropriate user interface to the system 104 or server 110), the appropriate virtual function(s) may be executed to perform the actions before eliminating the instance of the virtual function(s).

Although only one access control device 102, one management system 104, one credential device 106, one management server 110, one gateway device 112, one access control panel 114, and one mobile device 116 are shown in the illustrative embodiment of FIG. 1, the system 100 may include multiple access control devices 102, management systems 104, multiple credential device 106, management servers 110, gateway devices 112, access control panels 114, and/or mobile devices 116 in other embodiments. For example, as indicated above, the server 110 may be embodied as multiple servers in a cloud computing environment in some embodiments. Further, each user may be associated with one or more separate credential devices 106 in some embodiments.

Figure 2:
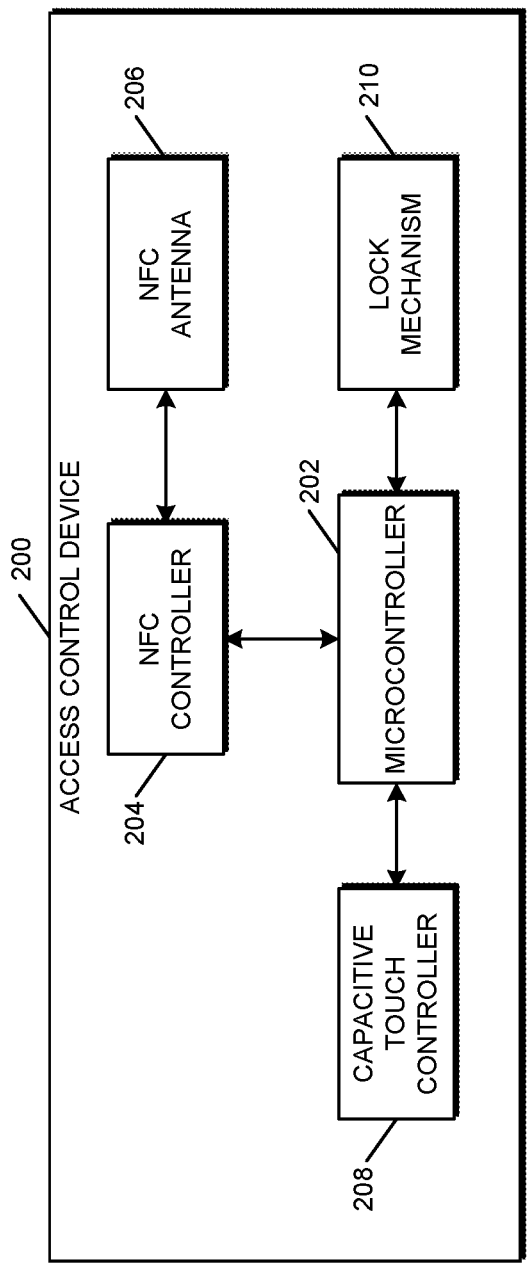
FIG. 2 is a simplified block diagram of at least one embodiment of an access control device of the access control system of FIG. 1.

Referring now to FIG. 2, a simplified block diagram of at least one embodiment of an access control device 200 for improving the interoperability of an RF antenna and capacitive touch keypad is shown. The illustrative access control device 200 includes a microcontroller 202, an NFC controller 204, an NFC antenna 206, a capacitive touch controller 208, and a lock mechanism 210. Although the microcontroller 202, the NFC controller, the NFC antenna 206, the capacitive touch controller 208, and the lock mechanism 210 are described herein to emphasize various aspects of those features, it should be appreciated that the access control device 200 may include additional or alternative components, such as those commonly found in an access control device or embedded control system, for example, in other embodiments. Further, in some embodiments, one or more of the components of the access control device 200 described herein may be omitted from the particular access control device 200 (e.g., the lock mechanism 210). It should be further appreciated that, in some embodiments, the access control device 200 may be embodied as or include the features of the access control device 102 of FIG. 1

The microcontroller 202 may be embodied as any type of microcontroller or integrated circuit capable of performing the functions described herein. As shown in FIG. 2, the microcontroller 202 is communicatively coupled to the NFC controller 204, the capacitive touch controller 208, and the lock mechanism 210. For example, in some embodiments, the microcontroller 202 is electrically coupled to the NFC controller 204, the capacitive touch controller 208, and/or the lock mechanism 210. As described in greater detail below, the microcontroller 202 is configured to process data received from the NFC controller 204 and the capacitive touch controller 208. The microcontroller 202 may be configured to operate in different power states. Each of the power states of the microcontroller 202 may consume a different amount of power in operation. For example, each power state may be associated with a different set of functionality of the microcontroller 202 depending on the particular embodiment. The number of power states of the microcontroller 202 or associated therewith may vary depending on the particular embodiment. One power state may be a "low power" state in the sense that it consumes less power than a fully active power state of the microcontroller 202. In some embodiments, the microcontroller 202 has at least a low power sleep state in which the microcontroller 202 consumes zero or a negligible amount of power in operation and a higher (or full) power wake state in which the microcontroller 202 consumes a greater amount of power in operation. Although described primarily in reference to the power state of the microcontroller, it should be appreciated that a particular power state of the access control device 200 may involve adjusting the power state of one or more other components of the access control device 200 in some embodiments.

The NFC controller 204 may be embodied as any type of controller or circuit configured to transmit and/or receive NFC communication signals via the NFC antenna 206. Although described herein as separate components, it should be appreciated that the NFC controller 204 and the NFC antenna 206 may form portions of the same integrated circuit, circuitry, chipset, module, and/or other component in some embodiments. As described in greater detail below, the NFC controller 204 is configured to monitor the RF field using the NFC antenna 206. In particular, the NFC controller 204 is configured to process signals induced by the RF field detected by the NFC antenna 206. It should be appreciated that the NFC antenna 206 may be embodied as any type and format of antenna configured to operate at 13.56 MHz to receive signals propagated by NFC devices and/or to otherwise perform the functions described herein. For example, in some embodiments, the NFC antenna 206 may have a loop antenna design that is integrated with a printed circuit board. Although the access control device 200 is described as having the NFC controller 204 and the NFC antenna 206, it should be appreciated that, in other embodiments, the NFC controller 204 and the NFC antenna 206 may be alternatively embodied as an RF controller and an RF antenna configured to detect and process signals unrelated to NFC and/or on a different frequency band (e.g., other than 13.56 MHz nominal frequency). In some embodiments, the NFC controller 204 may be embodied as a CLRC663+ controller manufactured by NXP.

The capacitive touch controller 208 may be configured to transmit and receive signals to a capacitive touch keypad in order to detect whether a user has pressed a particular key of the capacitive touch keypad. In many embodiments, a capacitive touch keypad includes a plurality of transmit lines corresponding with columns of keys of the capacitive touch keypad and a plurality of receive lines corresponding with the rows of keys of the capacitive touch keypad (or alternatively transmit lines corresponding with key rows and receive lines corresponding with key columns). It should be appreciated that each key is associated with a corresponding loop circuit that is formed from the capacitive touch controller 208 through the transmit line associated with that key and through the receive line associated with that key back to the capacitive touch controller 208. When a user touches a particular key location (e.g., using a finger), the capacitance of the loop including the particular key location alters in a manner that can be detected by the capacitive touch controller 208 such that the capacitive touch controller 208 can determine which key location was touched. Although described as processing signals received from a capacitive touch keypad, it should be appreciated that the capacitive touch controller 208 may be configured to process signals received from another type of capacitive touch device and/or capacitive touch component in other embodiments.

The lock mechanism 210 is configured to control access through a passageway. For example, in some embodiments, the lock mechanism 210 may be configured to be positioned in a locked state in which access to the passageway is denied, or positioned in an unlocked state in which access to the passageway is permitted. In some embodiments, the lock mechanism 210 includes a deadbolt, latch bolt, lever, and/or other mechanism adapted to move between the locked and unlocked state and otherwise perform the functions described herein. However, it should be appreciated that the lock mechanism 210 may be embodied as any another mechanism suitable for controlling access through a passageway in other embodiments.

Figure 3:
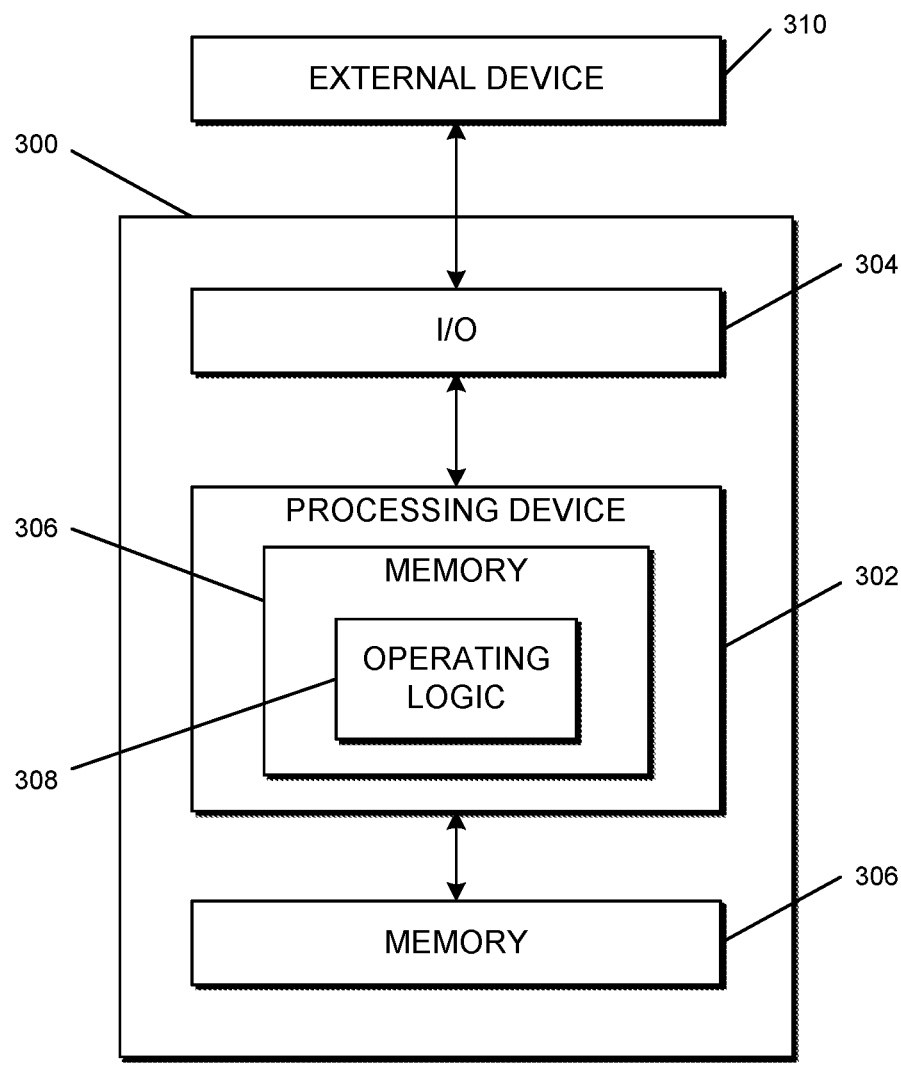
FIG. 3 is a simplified block diagram of at least one embodiment of a computing system.

Referring now to FIG. 3, a simplified block diagram of at least one embodiment of a computing system 300 is shown. The illustrative computing system 300 depicts at least one embodiment of a computing device/system that may be utilized in connection with the access control device 102, the management system 104, the credential device 106, the management server 110, the gateway device 112, the access control panel 114, and/or the mobile device 116 illustrated in FIG. 1. Depending on the particular embodiment, the computing system 300 may be embodied as a mobile computing device, server, desktop computer, laptop computer, tablet computer, notebook, netbook, Ultrabook™, cellular phone, smartphone, wearable computing device, personal digital assistant, Internet of Things (IoT) device, control panel, router, gateway, and/or any other computing, processing, and/or communication device capable of performing the functions described herein.

The computing system 300 includes a processing device 302 that executes algorithms and/or processes data in accordance with operating logic 308, an input/output device 304 that enables communication between the computing system 300 and one or more external devices 310, and memory 306 which stores, for example, data received from the external device 310 via the input/output device 304.

The input/output device 304 allows the computing system 300 to communicate with the external device 310. For example, the input/output device 304 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry may be configured to use any one or more communication technologies (e.g., wireless or wired communications) and associated protocols (e.g., Ethernet, Bluetooth®, Wi-Fi®, WiMAX, Ultra-Wide Band, etc.) to effect such communication depending on the particular computing system 300. The input/output device 304 may include hardware, software, and/or firmware suitable for performing the techniques described herein.

The external device 310 may be any type of device that allows data to be inputted or outputted from the computing system 300. For example, in various embodiments, the external device 310 may be embodied as one of more of the devices/systems of FIG. 1. Further, in some embodiments, the external device 310 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 310 may be integrated into the computing system 300.

The processing device 302 may be embodied as any type of processor(s) capable of performing the functions described herein. In particular, the processing device 302 may be embodied as one or more single or multi-core processors, microcontrollers, or other processor or processing/controlling circuits. For example, in some embodiments, the processing device 302 may include or be embodied as an arithmetic logic unit (ALU), central processing unit (CPU), digital signal processor (DSP), and/or another suitable processor(s). The processing device 302 may be a programmable type, a dedicated hardwired state machine, or a combination thereof. Processing devices 302 with multiple processing units may utilize distributed, pipelined, and/or parallel processing in various embodiments. Further, the processing device 302 may be dedicated to performance of just the operations described herein, or may be utilized in one or more additional applications. In the illustrative embodiment, the processing device 302 is of a programmable variety that executes algorithms and/or processes data in accordance with operating logic 308 as defined by programming instructions (such as software or firmware) stored in memory 306. Additionally or alternatively, the operating logic 308 for processing device 302 may be at least partially defined by hardwired logic or other hardware. Further, the processing device 302 may include one or more components of any type suitable to process the signals received from input/output device 304 or from other components or devices and to provide desired output signals. Such components may include digital circuitry, analog circuitry, or a combination thereof.

The memory 306 may be of one or more types of non-transitory computer-readable media, such as a solid-state memory, electromagnetic memory, optical memory, or a combination thereof. Furthermore, the memory 306 may be volatile and/or nonvolatile and, in some embodiments, some or all of the memory 306 may be of a portable variety, such as a disk, tape, memory stick, cartridge, and/or other suitable portable memory. In operation, the memory 306 may store various data and software used during operation of the computing system 300 such as operating systems, applications, programs, libraries, and drivers. It should be appreciated that the memory 306 may store data that is manipulated by the operating logic 308 of processing device 302, such as, for example, data representative of signals received from and/or sent to the input/output device 304 in addition to or in lieu of storing programming instructions defining operating logic 308. As shown in FIG. 3, the memory 306 may be included with the processing device 302 and/or coupled to the processing device 302 depending on the particular embodiment. For example, in some embodiments, the processing device 302, the memory 306, and/or other components of the computing system 300 may form a portion of a system-on-a-chip (SoC) and be incorporated on a single integrated circuit chip.

In some embodiments, various components of the computing system 300 (e.g., the processing device 302 and the memory 306) may be communicatively coupled via an input/output subsystem, which may be embodied as circuitry and/or components to facilitate input/output operations with the processing device 302, the memory 306, and other components of the computing system 300. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing system 300 may include other or additional components, such as those commonly found in a typical computing device (e.g., various input/output devices and/or other components), in other embodiments. It should be further appreciated that one or more of the components of the computing system 300 described herein may be distributed across multiple computing devices. In other words, the techniques described herein may be employed by a computing system that includes one or more computing devices.

Additionally, although only a single processing device 302, I/O device 304, and memory 306 are illustratively shown in FIG. 3, it should be appreciated that a particular computing system 300 may include multiple processing devices 302, I/O devices 304, and/or memories 306 in other embodiments. Further, in some embodiments, more than one external device 310 may be in communication with the computing system 300.

Figure 4:
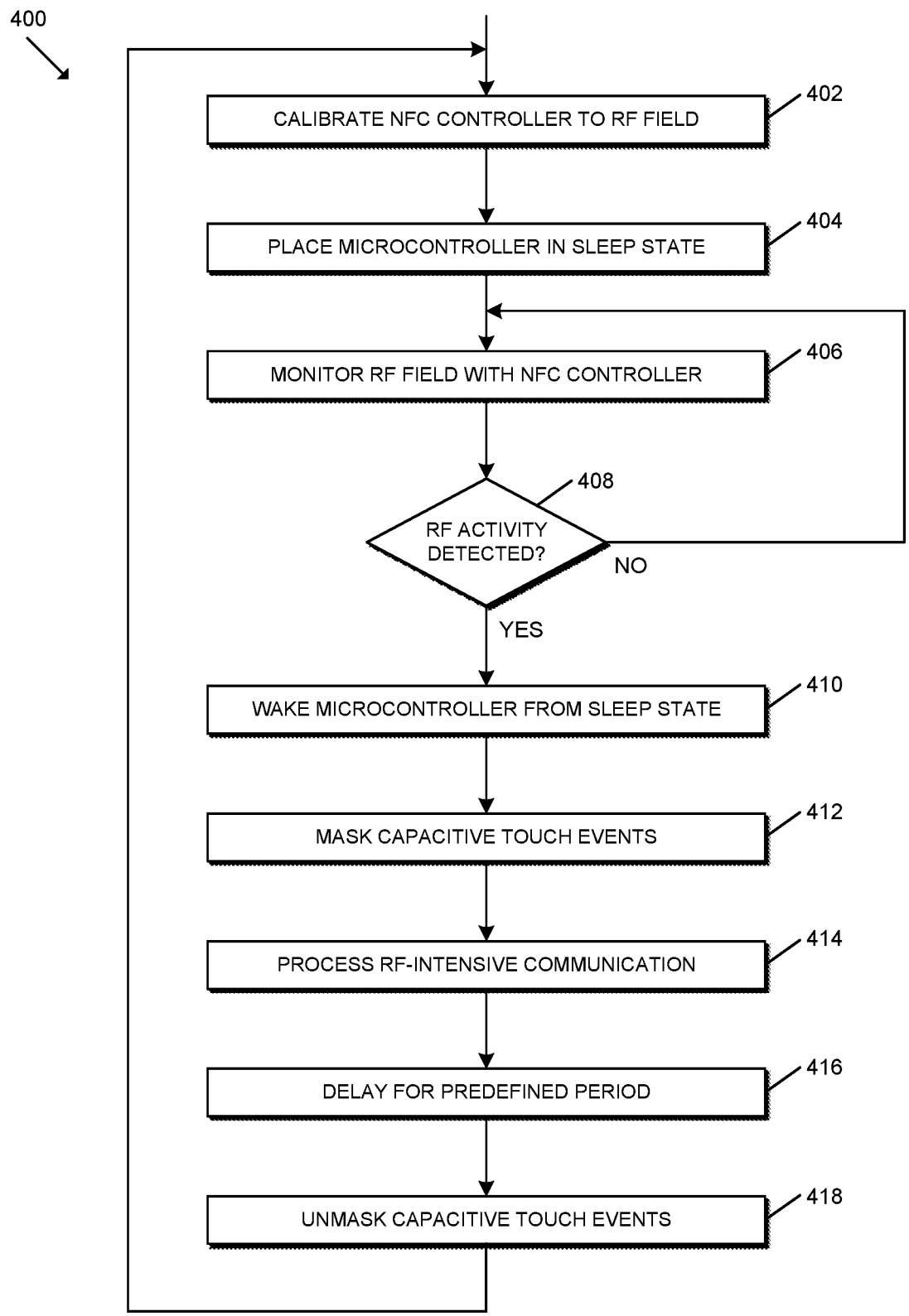
FIG. 4 is a simplified flow diagram of at least one embodiment of a method for improving the interoperability of an RF antenna and capacitive touch keypad in the access control device of FIG. 2.

Referring now to FIG. 4, in use, the system 100 or, more specifically, the access control device 200 may execute a method 400 for improving the interoperability of an RF antenna and capacitive touch in an access control device. It should be appreciated that, without the technologies described herein, the capacitive touch controller 208 may falsely detect a key press due to the capacitive touch circuit being energized from noise when an RF transaction is happening on the NFC antenna 206 (or other RF antenna). As described below, the method 400 improves the interoperability of the RF antenna (e.g., the NFC antenna 206) and capacitive touch (e.g., the capacitive touch controller 208) by masking capacitive touch events during intense RF activity such that spurious noise does not adversely affect the user experience due to falsely detected key presses.

It should be appreciated that the particular blocks of the method 400 are illustrated by way of example, and such blocks may be combined or divided, added or removed, and/or reordered in whole or in part depending on the particular embodiment, unless stated to the contrary.

The illustrative method 400 begins with block 402 in which the access control device 200 calibrates the NFC controller 204 to a current state of the RF field detected by the NFC antenna 206 of the access control device 200. For example, in some embodiments, the NFC controller 204 may use low power card detection (LPCD) or similar techniques in which it pings for changes in the RF field to determine whether there is an object in the field (e.g., a credential device), and if the field changes such that the new field exceeds established sleep thresholds, the NFC controller 204 wakes up to alert the microcontroller 202 that the RF field has exceeded one or more thresholds. Accordingly, in calibrating the NFC controller 204 to the RF field, the NFC controller 204 determines the current state of the RF field (which may or may not be a completely "empty" RF field) against which the NFC controller 204 may compare subsequent differences in the RF field. In block 404, the microcontroller 202 is placed in a sleep state.

In block 406, the NFC controller 204 monitors the RF field via the NFC antenna 206 to determine whether the RF field changes. For example, the NFC controller 204 may monitor the RF field to determine whether one or more RF field values associated with the RF field has surpassed a corresponding predefined threshold (e.g., established during the calibration). In some embodiments, the RF field values associated with the RF field may include in-phase and quadrature signal values (i.e., I and Q values). However, it should be appreciated that the NFC controller 204 may monitor different characteristics of the RF field to identify changes in the RF field in other embodiments. In other words, the NFC controller 204 monitors the RF field to determine whether the RF field has detuned sufficiently to surpass a threshold established by the NFC controller 204 to be indicative of new RF activity (or potential RF activity).

If the NFC controller 204 determines, in block 408, that no RF activity has been detected (e.g., due to the RF field values remaining within the thresholds/bounds), the method 400 returns to block 406 in which the NFC controller 204 continues to monitor the RF field. In other embodiments, it should be appreciated that the NFC controller 204 may return to block 402 to re-calibrate the NFC controller 204 (e.g., periodically) and/or modify the thresholds. If the NFC controller 204 determines, in block 408, that RF activity has been detected, the method 400 advances to block 410 in which the microcontroller 202 wakes from the sleep state. For example, in some embodiments, the NFC controller 204 may prompt the microcontroller 202 to wake from the sleep state. Although described as detecting RF activity, it should be appreciated that the RF field may detune from other activity (e.g., a non-RF device metallic device entering the field, temperature changes, etc.) which may also prompt the microcontroller 202 to be awaken from the sleep state. In some embodiments, the NFC controller 204 may make a polling request (e.g., a REQA or REQB under ISO/IEC 14443) to determine whether a credential device 106 (e.g., mobile phone, smartcard, etc.) is in the RF field.

In block 412, the access control device 200 masks capacitive touch events generated by and/or detected by the capacitive touch controller 208. For example, in some embodiments, the capacitive touch controller 208 may transmit one or more signals or data indicative of the capacitive touch events to the microcontroller 202, but the capacitive touch events may be masked in the sense that the microcontroller 202 ignores those signals or data. In other embodiments, the capacitive touch events generated or received by the capacitive touch controller 208 are otherwise prevented from being processed by the microcontroller 202 (e.g., by never being transmitted to the microcontroller 202 during a masking period). In yet other embodiments, the capacitive touch controller 208 and/or capacitive touch event features thereof may be disabled during a masking period.

In block 414, the access control device 200 (e.g., microcontroller 202) processes RF-intensive communications associated with the detected RF activity and, in block 416, there is a delay of a predefined delay period after processing the RF-intensive communications. In block 418, after the conclusion of the predefined delay period, the capacitive touch events are unmasked, and the method 400 returns to block 402 to re-calibrate the NFC controller 204 to the now-current (new) state of the RF field detected by the NFC antenna 206 of the access control device 200. Accordingly, after being unmasked, the microcontroller 202 resumes processing any capacitive touch events received from the capacitive touch controller 208.

If the microcontroller 202 wakes up and determines that there is no credential device 106 in the RF field, the microcontroller 202 may return to a sleep state fairly quickly. However, if there is a credential device 106 in the field, the microcontroller 202 may execute those operations, which may involve multiple RF-based communications between the access control device 200 and the credential device 106. For example, in some embodiments, the credential device 106 may transmit access credential data to be authenticated by the access control device 200. It should be appreciated that, in the illustrative embodiment, irrespective of the particular data being exchanged, the access control device 200 knows when the RF-intensive communication concludes. By way of example, such interactions may take 250 ms to 1.5 s in some embodiments of the access control system 200. After the conclusion of the RF-intensive communications, the predefined delay period allows the electrical components to "calm down" (e.g., the NFC-related and/or capacitive touch-related circuitry) to mitigate the possibility of potential noise interference. In some embodiments, the predefined delay period may on the order of hundreds of milliseconds to, for example, about 1.5 seconds.

However, it should be appreciated that the predefined delay period may be another period of time depending on the particular circuitry of the access control device 200.

Although the blocks 402-418 are described in a relatively serial manner, it should be appreciated that various blocks of the method 400 may be performed in parallel in some embodiments.

What is claimed is:

1. A method, comprising:
   placing a microcontroller of an access control device in a sleep state;
   monitoring a radio frequency (RF) field using a near field communication (NFC) controller electrically coupled to an NFC antenna of the access control device;
   waking the microcontroller from the sleep state in response to detecting that an RF field value of the RF field has surpassed a predefined threshold;
   ignoring capacitive touch events received by the microcontroller from a capacitive touch controller in response to waking the microcontroller from the sleep state;
   processing an exchange of access credential data via multiple RF-intensive communications between the access control device and a mobile device to authenticate the access credential data while ignoring the capacitive touch events during the multiple RF-intensive communications to prevent false detection of capacitive touch events due to noise from the multiple RF-intensive communications;
   concluding the multiple RF-intensive communications used for the exchange of access credential data after authenticating the credential data;
   initiating a delay for a predefined delay period after concluding the processing of the multiple RF-intensive communications between the access control device and the mobile device to mitigate noise from the multiple RF-intensive communications from interfering with the processing of capacitive touch events by the microcontroller; and
   after delaying for the predefined delay period after concluding the processing of the multiple RF-intensive communications, enabling the processing of capacitive touch events received by the microcontroller from the capacitive touch controller.

2. The method of claim 1, further comprising calibrating the NFC controller to a current state of the RF field detected by the NFC antenna of the access control device.

3. The method of claim 2, wherein placing the microcontroller in the sleep state comprises placing the microcontroller in the sleep state in response to calibrating the NFC controller to the current state of the RF field.

4. The method of claim 3, further comprising re-calibrating the NFC controller to a new state of the RF field detected by the NFC antenna of the access control device in response to processing the capacitive touch events received by the microcontroller from the capacitive touch controller.

5. The method of claim 1, wherein the access control device comprises an electronic lock having a lock mechanism configured to control access to a passageway.

6. The method of claim 1, wherein the predefined delay period ranges from hundreds of milliseconds to 1.5 seconds.

7. An access control device, comprising:
   a radio frequency (RF) antenna;
   a capacitive touch controller;
   a wireless communication controller electrically coupled to the RF antenna and configured to process signals received using the RF antenna; and
   a microcontroller configured to operate in a wake state and a sleep state that consumes less power than the wake state;
   wherein the wireless communication controller is further configured to (i) monitor an RF field via the RF antenna and (ii) prompt the microcontroller to wake from the sleep state in response to detecting that an RF field value of the RF field has surpassed a predefined threshold; and
   wherein the microcontroller is further configured to (i) transition from the sleep state to the wake state, (ii) ignore capacitive touch events received from the capacitive touch controller after the transition to the wake state, (iii) process an exchange of access credential data via multiple RF-intensive communications between the access control device and a mobile device to authenticate the access credential data while the capacitive touch events are ignored during the multiple RF-intensive communications to prevent false detection of capacitive touch events due to noise from the multiple RF-intensive communications, (iv) conclude the multiple RF-intensive communications used for the exchange of access credential data after authenticating the access credential data and then initiate a delay for a predefined period of time, and (v) enable the processing of capacitive touch events received from the capacitive touch controller after delaying for the predefined delay period upon concluding the processing of the multiple RF-intensive communications to authenticate the credential communication to mitigate noise from the RF-intensive communications from interfering with the processing of capacitive touch events by the microcontroller.

8. The access control device of claim 7, wherein the microcontroller consumes a negligible amount of power while in the sleep state.

9. The access control device of claim 7, wherein the RF antenna comprises a near field communication (NFC) antenna and the wireless communication controller comprises an NFC controller.

10. The access control device of claim 9, wherein the NFC controller is further configured to calibrate to a current state of the RF field detected by the NFC antenna.

11. The access control device of claim 10, wherein the microcontroller is further configured to transition from the wake state to the sleep state in response to calibration of the NFC controller.

12. The access control device of claim 11, wherein the NFC controller is further configured to re-calibrate to a new state of the RF field detected by the NFC antenna after delaying for the predefined delay period after processing the RF-intensive communication.

13. The access control device of claim 7, further comprising a lock mechanism configured to control access to a passageway.

14. The access control device of claim 7, wherein the predefined delay period ranges from hundreds of milliseconds to 1.5 seconds.

15. An access control device, comprising:
   a near field communication (NFC) antenna;
   a capacitive touch controller;
   an NFC controller electrically coupled to the NFC antenna and configured to process signals received using the NFC antenna; and
   a microcontroller configured to operate in a wake state and a sleep state that consumes less power than the wake state;

wherein the NFC controller is further configured to (i) monitor an RF field via the NFC antenna and (ii) prompt the microcontroller to wake from the sleep state in response to detecting that an RF field value of the RF field has surpassed a predefined threshold; and wherein the microcontroller is further configured to (i) transition from the sleep state to the wake state, (ii) process an exchange of access credential data via multiple RF-intensive communications between the access control device and a mobile device to authenticate the access credential data while capacitive touch events received by the capacitive touch controller are received by and ignored by the microcontroller during the multiple RF-intensive communications to prevent false detection of capacitive touch events due to noise from the multiple RF-intensive communications, (iii) conclude the multiple RF-intensive communications used for the exchange of access credential data after authenticating the access credential data, (iv) initiating a delay for a predefined delay period after the processing of the multiple RF-intensive communications has been concluded to authenticate the access credential data to mitigate noise from the multiple RF-intensive communications from interfering with the processing of capacitive touch events by the microcontroller, and (v) enable the processing of capacitive touch events received from the capacitive touch controller after the predefined delay period.

16. The access control device of claim 15, wherein the mobile device comprises one of a smartphone or a smartcard.

17. The access control device of claim 15, wherein the predefined delay period ranges from hundreds of milliseconds to 1.5 seconds.

* * * * *